United States Patent [19]

Sanderson

[11] Patent Number: 5,419,234
[45] Date of Patent: May 30, 1995

[54] AIRCRAFT SUPPORT PLANK MOUNTING OF 40 MM MACHINE GUNS

[76] Inventor: Paul H. Sanderson, 2019 Cripple Creek, Lewisville, Tex. 75067

[21] Appl. No.: 289,511

[22] Filed: Aug. 12, 1994

Related U.S. Application Data

[63] Continuation-in-part of Ser. No. 218,229, Mar. 25, 1994.

[51] Int. Cl.⁶ .............................................. F41A 23/00
[52] U.S. Cl. .................................. 89/37.22; 89/33.16
[58] Field of Search .................. 89/37.22, 37.19, 37.16, 89/33.16

[56] References Cited

U.S. PATENT DOCUMENTS

| | | | |
|---|---|---|---|
| 2,479,633 | 8/1949 | MacKenzie | 89/33.14 |
| 2,520,736 | 8/1950 | Reek et al. | 89/37.16 |
| 5,024,138 | 6/1991 | Sanderson et al. | 89/37.22 |
| 5,187,318 | 2/1993 | Sanderson et al. | 89/37.22 |

*Primary Examiner*—Stephen M. Johnson
*Attorney, Agent, or Firm*—Konneker & Bush

[57] ABSTRACT

An elongated support plank structure longitudinally extends transversely through the cabin area of a helicopter and has outer end portions projecting outwardly beyond opposite sides of the helicopter. A pair of 40 mm machine guns are mounted on the plank end portions and are supplied with belted ammunition from magazine boxes mounted on the plank within the cabin area via flexible feed chutes interconnected between the magazine boxes and generally V-shaped, interiorly rollered feed adapters interconnected between the outer ends of the feed chutes and the inlets of the machine gun feeder mechanisms. The 40 mm machine guns are secured to the outer plank end portions by specially designed mounting structures that may be selectively secured to (1) foldable tip portions of the plank structure pivotable relative thereto about horizontal hinge lines, (2) the hinge line portions of the plank when the foldable tip portions are removed, or (3) inboard gun mount stations disposed on the plank outer end portions inboard of the hinge lines. A 7.62 mm mini machine gun may be mounted on the support plank structure in addition to the two 40 mm machine guns.

15 Claims, 4 Drawing Sheets

AIRCRAFT SUPPORT PLANK MOUNTING OF 40 MM MACHINE GUNS

CROSS-REFERENCE TO RELATED APPLICATIONS

This application is a continuation-in-part of U.S. application Ser. No. 08/218,229, filed on Mar. 25, 1994 and entitled "FEED CHUTE-TO-GUN AMMUNITION BELT GUIDE ADAPTER FOR MACHINE GUNS" the disclosure of which is hereby incorporated herein by reference. The present application also discloses subject matter similar to that disclosed in U.S. application Ser. No. 08/060,867 now U.S. Pat. No. 5,390,582, filed on May 12, 1993 and entitled "PLANK-MOUNTED AIRCRAFT ARMAMENT APPARATUS"; and U.S. Pat. Nos. 5,024,138 and 5,187,318 to Sanderson et al. The disclosures of this application and two U.S. patents are also hereby incorporated by reference herein.

BACKGROUND OF THE INVENTION

The present invention generally relates to aircraft armament apparatus and, in a preferred embodiment thereof, more particularly relates to the external support plank mounting of machine guns at the cabin area of aircraft such as helicopters.

The external mounting on aircraft of weaponry such as machine guns, rocket launchers and the like, particularly in retrofit applications, has heretofore carried with it a variety of structural, operational and safety limitations and disadvantages. As but one example, the external mounting of machine guns on a helicopter has previously entailed securing an outwardly projecting metal support tube to the helicopter and then mounting the gun on the tube. While this seems to be a fairly straightforward approach, unavoidable limberness in the support tube often led to firing inaccuracies in the mounted gun due to wobbling of its firing axis relative to the aircraft.

To a great extent these problems have been eliminated by using the honeycombed metal support plank structure illustrated and described in U.S. Pat. No. 5,024,138 to Sanderson et al. This support plank structure is transversely insertable through the cabin portion of the aircraft in a manner such that a longitudinally central portion of the support plank is disposed within the cabin area, and outer end portions of the plank project outwardly from opposite sides of the body of the aircraft. The central plank portion within the cabin area is removably anchored to the aircraft (which may be a helicopter or a fixed wing aircraft) and outer tip portions of the plank are vertically pivotable, along plank structure hinge lines, between fully extended positions and upwardly and inwardly folded transport or storage positions.

At the outer ends of these foldable tip portions are downwardly projecting outboard weaponry mounting structures which, using conventional bomb lug connector apparatus, are operative to removably support a pair of multiple tube rocket launchers at their bottom ends. Mounted on the undersides of the outwardly projecting plank end portions, inwardly of the foldable plank tips, are a pair of inboard support structures operative to removably support a pair of machine guns such as 7.62 mm "mini guns".

While the support plank-based aircraft armament system illustrated and described in U.S. Pat. No. 5,024,138 has proven to be structurally superior to metal tube-type weaponry support systems, the use of the system has demonstrated a need in some instances to provide it with additional weaponry mounting and operation features and improvements. One such need involves the desirability in some instances of mounting on the support plank structure one or more 40 mm machine guns, guns which conventionally have been strictly "crew served" weapons as opposed to remote mounted weapons. It is accordingly an object of the present invention to provide support plank-based apparatus for mounting a 40 mm machine gun on an aircraft for remotely controlled firing operation.

SUMMARY OF THE INVENTION

In carrying out principles of the present invention, in accordance with a preferred embodiment thereof, support plank-based apparatus is provided for mounting a 40 mm machine gun exteriorly on an aircraft such as a helicopter. The apparatus includes an elongated support plank structure longitudinally extendable through the cabin area in a manner such that an outer end portion of the plank, having top and bottom sides, extends outwardly beyond a side of the aircraft.

Representatively, the outer plank end portion has a removable tip portion which is pivotable relative to the balance of the plank about a horizontal hinge line transverse to the length of the plank. A slot is formed through the outer plank end portion, between its top and bottom sides, and an inboard gun mount station is secured to the outer plank end portion between the slot and the plank hinge line.

The 40 mm machine gun is secured to the hinge line fitting of the outer plank end portion in a downwardly spaced relationship therewith longitudinally outwardly of the slot, the machine gun having a gun feeder mechanism with an inlet. A 40 mm ammunition magazine box is secured to a longitudinally intermediate portion of the top side of the support plank inboard of the slot and has an outlet opening. A flexible feed chute has an inlet connected to the magazine box outlet opening and an outlet end adjacent the gun feeder mechanism inlet.

The outer end of the feed chute is removably connected to the gun feeder inlet using a specially designed feed adapter comprising an angled housing through which an ammunition belt may be longitudinally supplied to the gun feeder mechanism, the housing having an outlet end connected to the gun feeder mechanism inlet, an inlet end connected to the outlet end of the feed chute, and a bent intermediate portion disposed between the housing inlet and outlet ends. A roller member is rotationally supported in the intermediate portion of the housing.

An ammunition belt formed from a series of releasably interlinked 40 mm ammunition rounds has an inner end portion disposed within the magazine box. From the interior of the magazine box the ammunition belt extends outwardly through the magazine box outlet opening and through the interior of the feed chute, passes through the interior of the housing and around its interior roller member, and has an outer end operatively connected to the gun feeder mechanism inlet.

In one embodiment of the armament apparatus the feed chute is extended downwardly through the plank slot to the feed adapter, and in a second embodiment is routed above and outwardly around the outer end of the projecting plank portion into the gun feeder mechanism. In this second embodiment the 40 mm machine gun is mounted on the plank hinge line, and a 7.62 mm mini machine gun is mounted on the inboard gun mount station, with feed chute for the 7.62 mm belted ammunition being extended through the plank slot between the mini gun and a 7.62 mm ammunition magazine box mounted on the longitudinally intermediate portion of the plank within the aircraft cabin area.

According to a feature of the invention, the 40 mm machine gun is mounted on the plank by a specially designed gun mount structure comprising a deck plate and a cradle structure depending from the underside of the deck plate and adapter to receive and operatively support the 40 mm machine gun. Means are provided for selectively mounting the deck plate on (1) the installed foldable tip section of the plank structure, (2) the hinge line portion of the plank structure when the tip section is removed, or (3) the inboard gun mount station.

DETAILED DESCRIPTION

Figure 1:
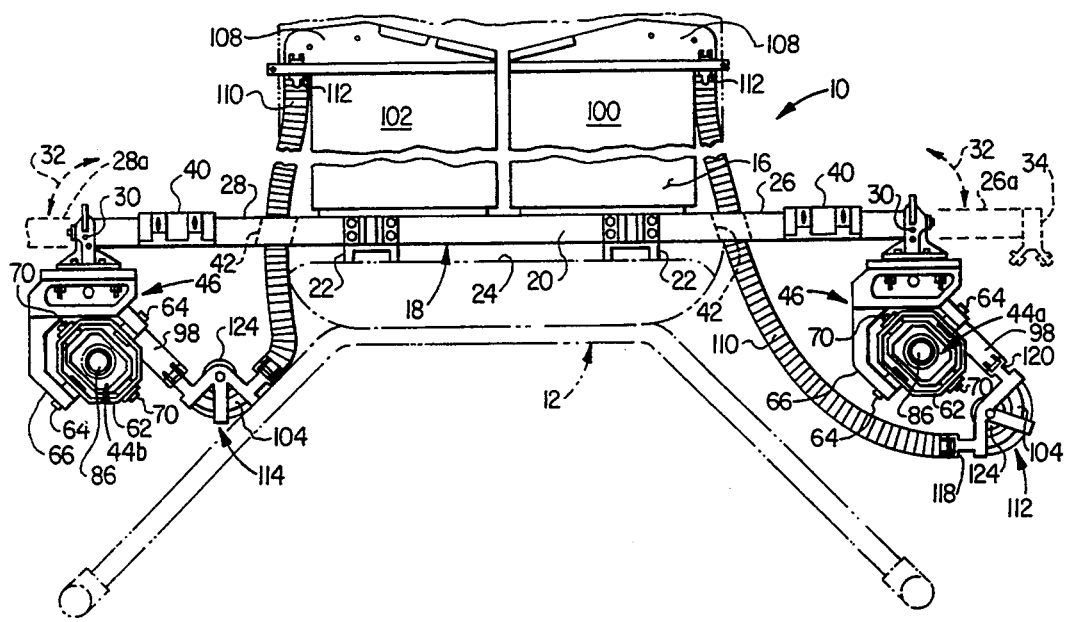
FIG. 1 is a partial front elevational view, in phantom, of a representative helicopter to which is operatively secured improved armament apparatus of the present invention that comprises an elongated armament support plank member carrying, on outer end portions thereof, a pair of 40 mm machine guns to which belted ammunition is fed using specially designed and oriented feed chute-to-gun ammunition belt guide adapters.

Referring initially to FIG. 1, the present invention provides improved armament apparatus 10 which is operatively connected to a representative helicopter 12 having a cabin area 16 positioned rearwardly of a cockpit area (not shown). The armament apparatus 10 includes an elongated metal support plank structure 18 which is substantially identical to the support plank structure illustrated and described in U.S. Pat. No. 5,024,138 to Sanderson et al which has been incorporated by reference herein.

The support plank structure 18 is longitudinally extended transversely through cabin area 16, and has a central longitudinal portion 20 with support channels 22 anchored thereto. Support Channels 22 are also anchored to the floor 24 of the cabin area 16, thus operatively securing armament apparatus 10 to the helicopter 12. Left and right outer end portions 26 and 28 of the support plank 18 (as viewed from the rear of the helicopter) project outwardly from opposite sides of the helicopter body and have outer tip sections 26a,28a that are illustrated in phantom in FIG. 1. Tip sections 26a,28a are pivotable, about hinge lines 30 relative to their associated plank portions 26 and 28, as indicated by the arrows 32 and as shown in copending U.S. application Ser. No. 08/060,867, and are removable from their associated plank portions 26 and 28.

Figures 4, 5, 6:
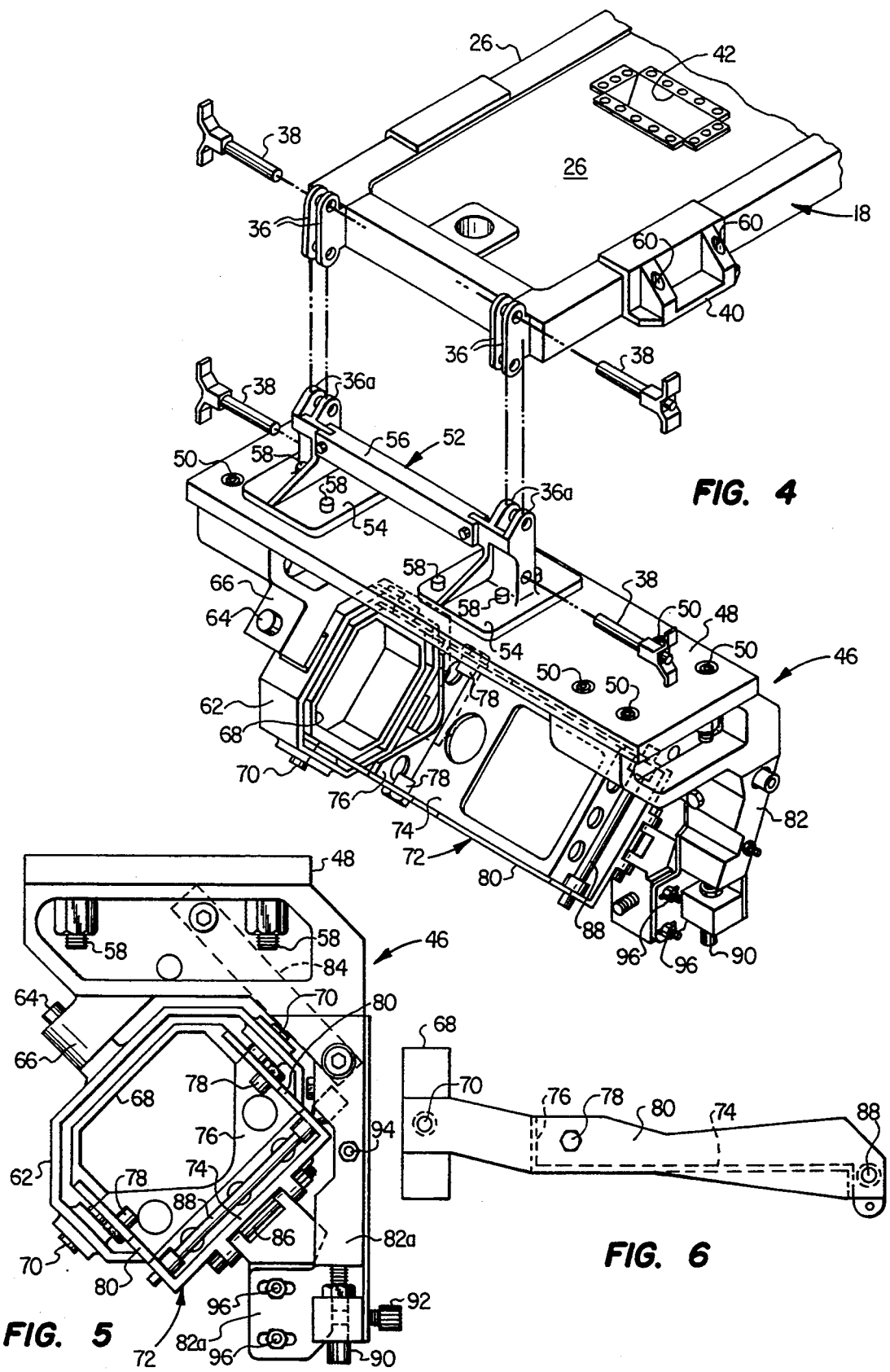
FIG. 4 is an enlarged scale rear end perspective view of a gun mount portion of the armament apparatus removed from its associated support plank portion.
FIG. 5 is an enlarged scale rear end elevational view of the gun mount.
FIG. 6 is a left side elevational view of a yoke portion of the gun mount as viewed in FIG. 4.

In the present invention the plank tip sections 26a and 28a are removed, being shown in phantom in FIG. 1 for reference purposes. To operatively secure weaponry (such as rocket launchers) to the plank tip sections, bomb rack structures 34 are mounted on their outer ends. As best illustrated in FIG. 4 in conjunction with the plank portion 26, mounting tab pairs 36 are formed on the outer ends of the opposite plank sections 26,28. Using the indicated ball pins 38 (or expansion pins) in conjunction with corresponding tab pairs (not shown) on the plank tip sections 26a,28a the removed plank tip sections may be pivotally secured to the tab pairs 36 as illustrated and described in U.S. Pat. No. 5,024,138. Also disposed on each of the plank end sections 26 and 28, as illustrated in FIGS. 1 and 4, are inboard gun mount stations 40, and rectangular slots 42 extending vertically through the end sections 26,28 inboard of the gun mount stations 40.

The present invention provides specially designed mounting apparatus for operatively supporting a pair of 40 mm machine guns 44a and 44b, heretofore strictly crew served weapons, on the support plank structure 18 respectively on its left and right end portions 26a and 28a as viewed from the rear of the helicopter 12. The gun mounting structure of the present invention includes a pair of gun support structures 46 which are illustrated as being removably connected to and depending from the outer ends of the plank sections 26 and 28 at the hinge lines 30. In a manner subsequently described, the gun support structures 46 may alternatively be secured to the inboard gun mount stations 40, or to the bomb racks 34 when the plank tip sections 26a,28a are installed.

Figure 3:
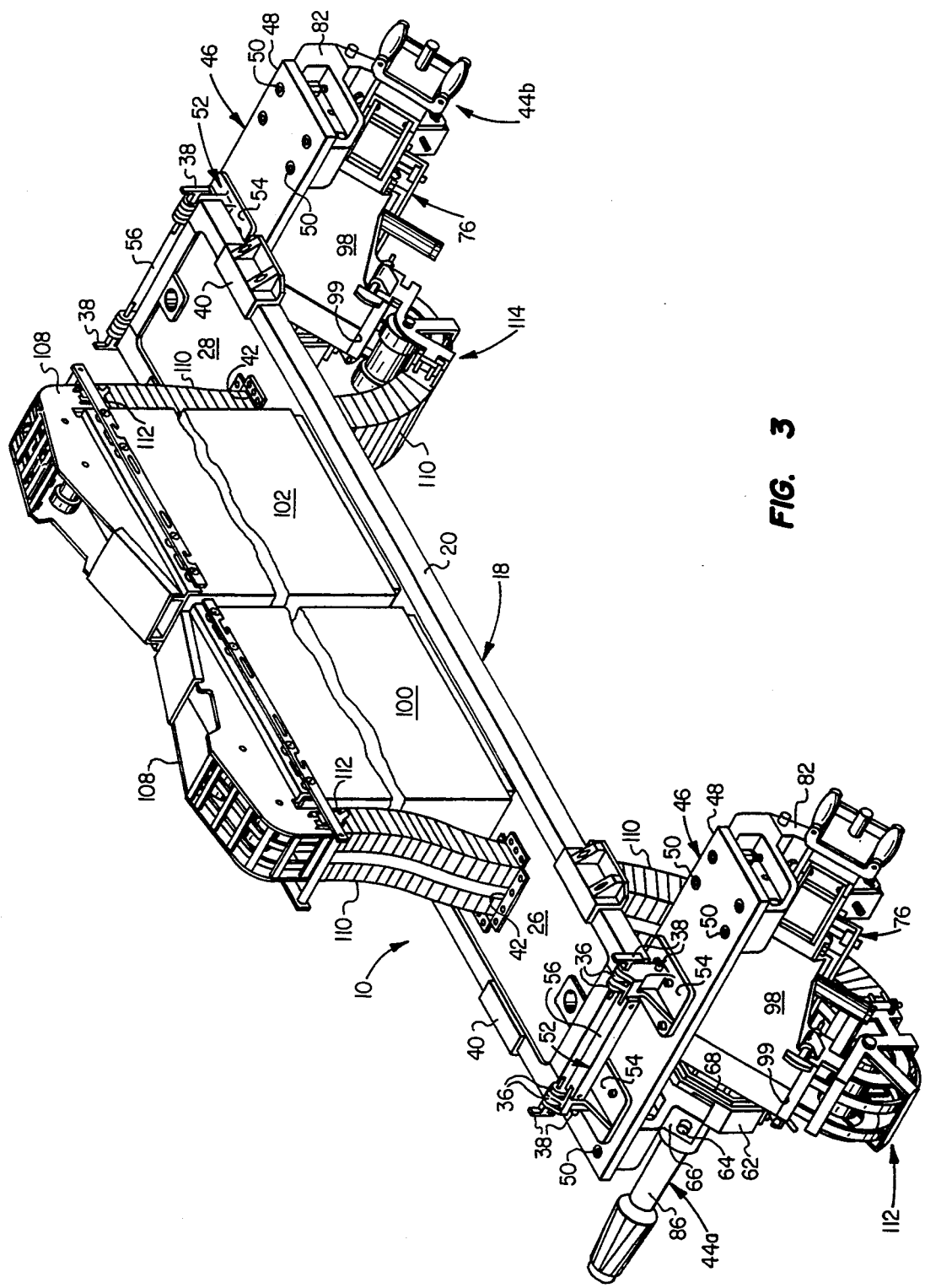
FIG. 3 is an enlarged scale rear side perspective view of the FIG. 1 armament apparatus removed from the helicopter.

Referring now to FIGS. 3–6, each of the gun support structures 46 includes, along its upper side, a rectangular deck plate 48 having a spaced series of circular mounting holes 50 formed therein. As illustrated in FIGS. 1, 3 and 4, with the plank tip sections 26a,28a removed, the gun support structures 46 are secured to the outer ends of the plank portions 26 and 28, at the hinge lines 30, using a hinge line adapter structure 52 having spaced apart connection plate portions 54 that are interconnected by an elongated bracing member 56. The connection plates 54 are removably secured to the deck plates 48 by bolts 58 passing through mounting holes in the plates 54 and appropriate ones of the deck plate holes 50 beneath the plates 54. Tab pairs 36a are formed on the upper sides of the plates 54, are interdigitated with the tab pairs 36 on the plank portions 26 and 28, and are removably secured to the tab pairs 36 by the pins 38 which are extended through aligned openings in the interdigitated tab sets 36 and 36a as best illustrated in FIG. 4.

As previously mentioned, in accordance with an important feature of the present invention the deck plate portion 48 of each of the gun support structures 46 is configured to also permit the support structure 46 (and thus the 40 mm machine gun that it carries) to alternatively be mounted on one of the inboard gun mount stations 40 or on one of the outer plank tip portions 26a,28a when such tip portions are connected to their associated plank end sections 26 and 28 as previously described.

For example, each opposite side of each of the inboard gun mount stations 40 has a spaced pair of vertical openings 60 formed therein that may be aligned with a corresponding pair of deck plate holes 50. With the hinge line adapter removed, mounting bolts (not shown) may be extended through the aligned mount station and deck plate openings to removably secure the gun support structure 46 to the inboard gun mount station 40. Alternatively, with the plank tip sections 26a and 28a in place, conventional bomb lug adapters (not shown) may be bolted to the deck plate 48 (using pairs of the deck plate holes 50) and secured to the bomb racks 34 (see FIG. 1) mounted on the plank tip sections 26a,28a. Accordingly, using the gun support structures 46, 40 mm machine guns 44 may be mounted on three selectively variable locations on each end of the overall support plank structure 18.

Referring now to FIGS. 1 and 3–6, in addition to its apertured deck plate portion 48, each of the gun support structures 46 also includes a gimbel ring 62 pivotally mounted on diametrically opposed bolts 64 rotatably received in a forward yoke structure 66 depending from a front end portion of the deck plate 48. The gimbel ring 62 outwardly circumscribes a forward cradle ring 68 pivotally supported on the gimbel ring 62, by diametrically opposed pins 70, for pivotal movement relative to the gimbel ring about an axis perpendicular to the pivot axis of the bolts 64. Secured to and extending rearwardly from the cradle ring 68 is a gun cradle structure 72 having a floor plate portion 74 with an upstanding bulkhead portion 76 disposed somewhat behind the cradle ring 68 and just in front of an opposed pair of forward gun mount studs 78 secured to transverse opposite side wall portions 80 on the floor plate 74.

An aft yoke structure 82 depends from the rear end of the deck plate 48 and is braced to the front yoke structure 66 by an elongated intermediate member 84. The rear end of the gun cradle structure 72 is secured to a vertically and horizontally movable portion 82a of the aft yoke structure 82 by a mounting bolt 86. As best illustrated in FIG. 3, each of the guns 44 is positioned atop the cradle portion 72 of its associated gun support structure 46, with the barrel 86 of the gun being extended through the gimbel and cradle rings 62 and 68. The gun is anchored to the cradle structure 72, for adjustable movement therewith, by means of the studs 78 which are connected to a front body portion of the gun, and an aft gun-to-cradle mounting pin 88 extending between rear end portions of the cradle side walls 80 and secured to a rear end portion of the gun body.

The firing axis of the mounted gun 44 may be selectively adjusted in vertical and horizontal directions by vertical and horizontal adjustment screws 90,92 that bear against the movable portion 82a of the aft yoke structure and may be appropriately rotated to move the yoke portion 82a, and thus the mounted gun 44, in vertical and/or horizontal directions. The adjusted cradle structure 72 may be vertically and horizontally locked in place using the indicated vertical and horizontal locking bolts 94 and 96.

Intermediate the front and aft yoke sections 66,82 of each of the gun support structures 46 ammunition feeder portions 98 of the two mounted 44 mm machine guns 44 project outwardly from their supporting cradle structures in leftward directions as viewed in FIG. 3. Each of the ammunition feeders 98 has a leftwardly facing inlet end 99 as indicated.

The two mounted 40 mm machine guns 44 are supplied with ammunition from two ammunition boxes 100 (see FIGS. 1 and 3) mounted atop the central plank portion 20 within the cabin area 16 and respectively serving the left and right guns 44 (as viewed from the rear). The ammunition is in the form of two conventional 40 mm ammunition belts 104 (see FIG. 7), each having releasably interlinked individual 40 mm ammunition rounds 106, stored in longitudinally serpentined orientations within the magazine boxes 100 and 102. From the interiors of their associated magazine boxes 100 and 102, the ammunition belts pass outwardly through interiorly rollered lids 108 positioned atop the magazine boxes and extend through the interiors of a pair of conventionally configured flexible feed chutes 110.

The upper inlet ends of the feed chutes 110 are removably secured to downwardly facing outlet openings 112 of the magazine box lids 100 and 102, with each feed chute passing downwardly from its associated outlet opening 112 through one of the plank slots 42 on the way to its associated machine gun 44. The lower or outer ends of the feed chutes 110 are respectively connected to the inlet ends 99 of the ammunition feeders 98 of their associated guns 44 by two specially designed feed chute adapters 112 and 114. As illustrated in FIGS. 1 and 3, the feed chute adapter 112 is connected to the ammunition feeder 98 of the left gun 44, and the feed chute adapter 112 is connected to the ammunition feeder 98 of the right gun 44.

The feed chute adapters 112,114 have similar constructions but have slightly different configurations, as will be subsequently described herein, with the left feed chute adapter 112 being representatively illustrated in detail in FIG. 7. Feed chute adapter 112, like the feed chute adapter 114, has an angled, open-latticed metal housing 1.16 having an open inlet end 118, an open outlet end 120, and a curved intermediate portion 122 disposed between the inlet and outlet ends 188,120. The housing 116 has a horizontally elongated rectangular cross-section along its length, and a roller member 124 extends across and is rotatably supported in the curved intermediate portion 122. The included angle of the angled housing 116 of the feed chute adapter 112 is approximately 22.5 degrees, while the included angle of the angled housing 116 of the other feed chute adapter 114 (see FIG. 1) is approximately 90 degrees.

Horizontally opposite sides of the outlet ends 120 of the housings 116 of the adapters 112 and 114 are provided with a fixed mounting lug 126 and a spring clip latch 128 which are removably secured to corresponding attachment fittings on the ammunition feeder inlets 99 on the guns 44. Horizontally opposite sides of the inlet ends 118 of the housings 116 of the adapters 112 and 114 are provided with latch brackets 130 which are removably connected to latch pin structures 132 on the outlet ends 110a of the feed chutes 110 (see FIG. 7), thereby communicating the open inlet end 118 of each adapter housing 116 with the facing outlet end 110a of its associated feed chute 110.

Figure 7:
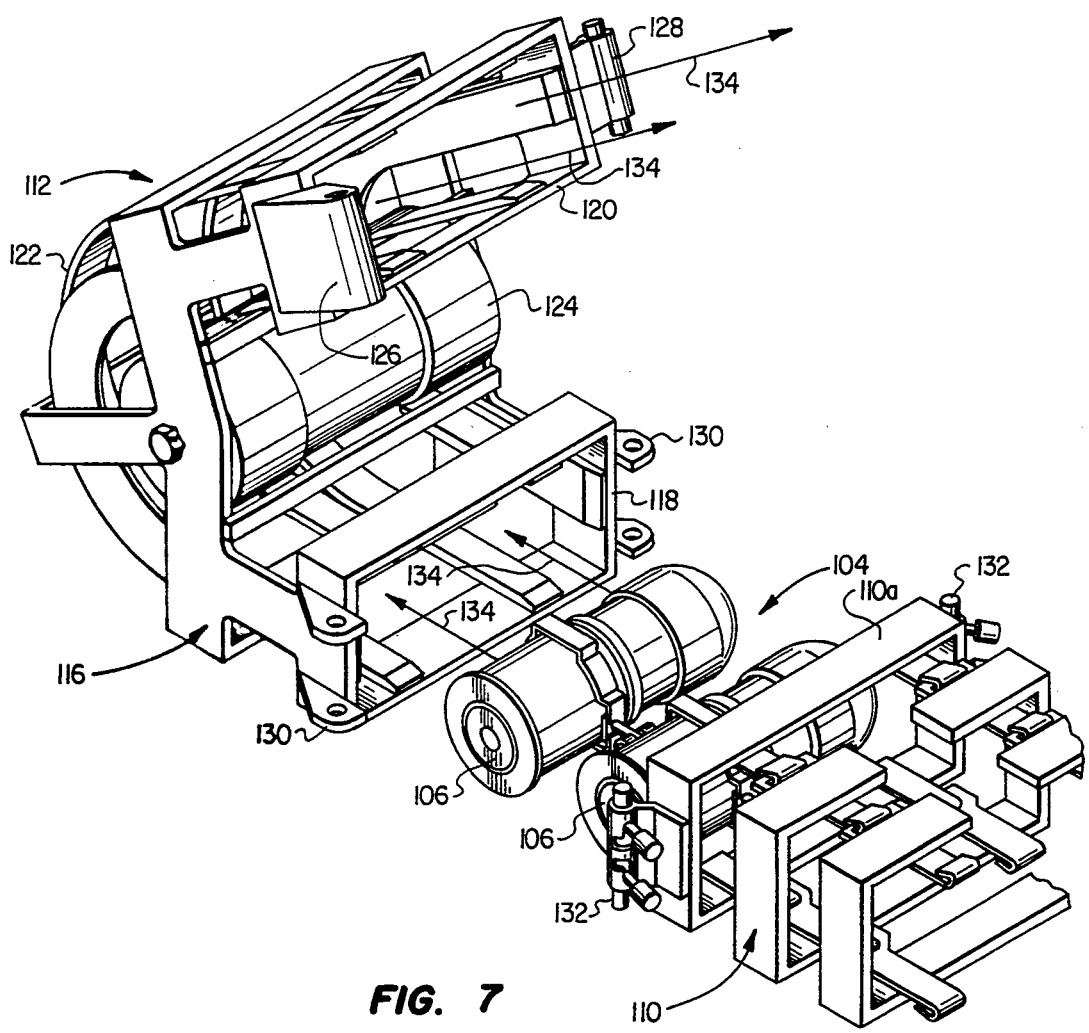
FIG. 7 is an enlarged scale partially exploded perspective view of one of the ammunition feed chute adapter portions of the armament apparatus and adjacent ends of an ammunition belt and feed chute connected thereto.

As representatively illustrated in FIG. 7, each ammunition belt 104 extends through its feed chute 110, passes through the curved interior passage of its associated adapter housing 116 around the roller 124 as indicated by the arrows 134, exits the outlet end 120 of the housing 116, and operatively enters the ammunition feeder portion 98 of its associated machine gun 44. The ammunition belt 104, and its associated feed chute 110, serving the left gun 44a passes under the gun 44a and extends through the feed chute adapter 112 mounted on the outboard side of the gun 44a. The ammunition belt 104, and its associated feed chute 110, serving the right gun 44b extends through the feed chute adapter 114 mounted on the inboard side of the gun 44b.

Figure 2:
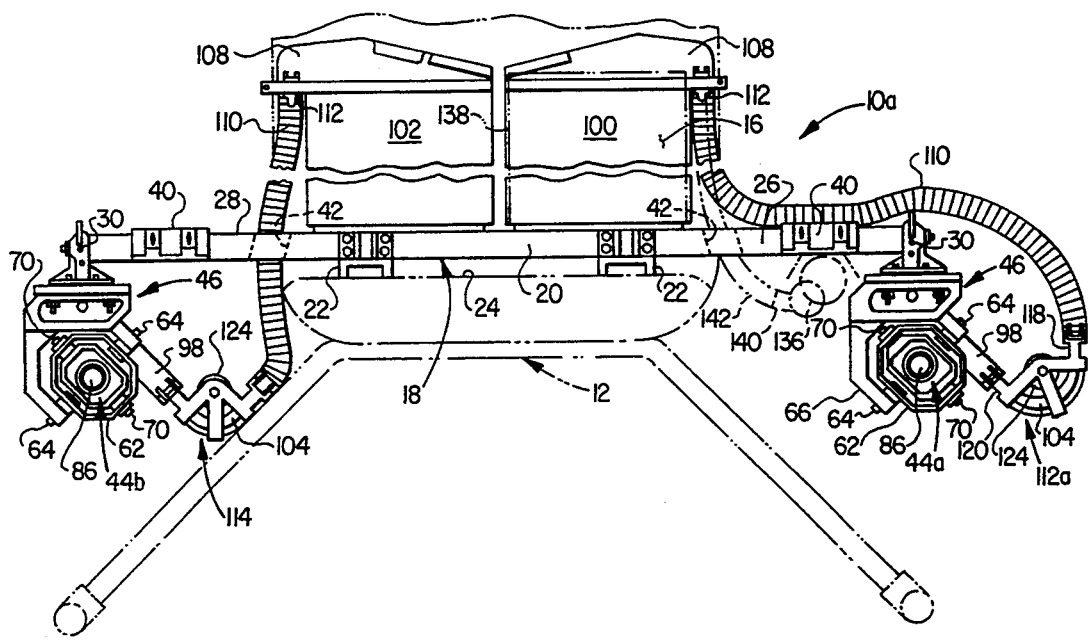
FIG. 2 is a partial front elevational view of an alternate embodiment of the armament apparatus in which a 7.62 mm "mini" machine gun is added, and the feed chute routing at one of the 40 mm machine guns has been modified to accommodate the addition of the 7.62 mm machine gun.

An alternate plank mounted armament apparatus configuration 10a is illustrated in FIG. 2 and includes the 40 mm machine guns 44a,44b carried by the gun support structures 46 connected to the plank end portions 26a,28a at their hinge lines 30 as previously described herein, and additionally includes a 7.62 mm "mini" machine gun 136 secured to the bottom side of the left inboard gun mount station 40. Belted ammunition is supplied to the mini machine gun 136 by means of a serpentined 7.62 mm ammunition belt stored in a suitable magazine box 138 supported on the intermediate plank portion 20 immediately in front of the 40 mm magazine box 100.

The 7.62 mm ammunition belt is routed to the gun feeder mechanism 140 of the mini machine gun 136 through the interior of a flexible feed chute 142 the extends from the outlet opening of the magazine box 138, downwardly through the slot 42 in the left plank end section 26, and is connected to the gun feeder 140. As illustrated in FIG. 2, the feed chute 110 associated with the left 44 mm machine gun 44a is not routed through the plank slot 42 as it was in the FIG. 1 armament configuration 10. Instead, this left feed chute 110 is extended across the top side of the plank section 26, bent downwardly over its outer end, and then connected to the ammunition feeder 98 of the left gun 44a using a modified version 112a of the previously described feed chute adapter 112 interconnected between the outer end of the left feed chute 110 and its associated ammunition feeder 98. The feed chute adapter 112a is identical to the feed chute adapter except that, relative to the left gun 44a, the feed chute adapter 112a is rotated so that its inlet end 118 faces upwardly, and the positions of the mounting lug 126 and the spring clip latch 128 (see FIG. 7) are reversed on the outlet end 120 to accommodate the connection of the feed chute adapter 112a to the ammunition feeder 98 of the left gun 44a.

It can be seen from the foregoing that the remote mounting of the traditionally crew served 40 mm machine guns 44a,44b is facilitated by the mounting of the guns at the plank hinge centerlines to provide sufficient room to route the feed chutes 110 to the guns. Additionally, the relatively sharp angles at which the feed chutes 110 must be connected to the guns 44 (particularly in the case of the left gun 44a), that might otherwise cause round jamming at the gun feeders 98, are compensated for by the rollered feed chute adapters 112,114 that stabilize the ammunition belts 104 at these critical feed locations as well as provide for their routing around these sharp bends without twisting or being otherwise deformed in a manner causing ammunition jamming at the guns.

The remote mounting of the 40 mm machine guns 44 on the plank structure 18 is provided with a very desirable degree of positional flexibility by the construction of the gun support structures 46 which, as previously described herein, may be selectively be positioned (1) at the plank hinge centerlines 30 as shown, (2) on the inboard gun mount stations 40, or (3) on the bomb racks 34 when the plank tip sections 26a,28a are installed.

The foregoing detailed description is to be clearly understood as being given by way of illustration and example only, the spirit and scope of the present invention being limited solely by the appended claims.

What is claimed is:

1. Aircraft armament apparatus comprising:
   a support plank having a top side, a bottom side, an outer end portion, and a slot extending through said outer end portion from said top side to said bottom side;
   a 40 mm machine gun secured to said bottom side of said outer end portion of said support plank in a downwardly spaced relationship therewith longitudinally outwardly of said slot, said 40 mm machine gun having a gun feeder mechanism with an inlet;
   a 40 mm ammunition magazine box secured to a longitudinally intermediate portion of said top side of said support plank inboard of said slot and having an outlet opening;
   a flexible feed chute having an inlet connected to said magazine box outlet opening and an outlet end adjacent said gun feeder mechanism inlet;
   a feed adapter interconnected between said gun feeder mechanism inlet and said outlet end of said feed chute, said feed adapter including:
      an angled housing having an outlet end connected to said gun feeder mechanism inlet, an inlet end connected to said outlet end of said feed chute, and a bent intermediate portion disposed between the housing inlet and outlet ends, and
      a roller member rotationally supported in said intermediate portion of said housing; and
   an ammunition belt formed from a series of releasably interlinked 40 mm ammunition rounds, said ammunition belt having an inner end portion disposed within said magazine box, extending outwardly through said outlet opening of said magazine box and through the interior of said feed chute, passing through the interior of said angled housing and around said roller member, and having an outer end operatively connected to said gun feeder mechanism inlet.

2. The aircraft armament apparatus of claim 1 wherein:
   said angled housing has an included angle of approximately 90 degrees.

3. The aircraft armament apparatus of claim 1 wherein:
   said angled housing has an included angle of approximately 22.5 degrees.

4. The aircraft armament apparatus of claim 1 wherein:
   said 40 mm machine gun has an outboard side,
   said gun feeder mechanism inlet is on said outboard side of said 40 mm machine gun,
   said inlet end of said angled housing is disposed below said 40 mm machine gun and faces generally in an inboard direction, and
   said feed chute extends from said ammunition magazine box outlet opening through said slot and beneath said 40 mm machine gun to said inlet end of said angled housing.

5. The aircraft armament apparatus of claim 1 wherein:

said 40 mm machine gun has an inboard side,
said gun feeder mechanism inlet is on said inboard side of said 40 mm machine gun,
said inlet end of said angled housing faces in an inboard, upwardly sloped direction, and
said feed chute extends from said ammunition magazine box outlet opening through said slot to said inlet end of said angled housing.

6. The aircraft armament apparatus of claim 1 wherein:
said 40 mm machine gun has an outboard side,
said gun feeder mechanism inlet is on said outboard side of said 40 mm machine gun,
said inlet end of said angled housing faces in an outboard, upwardly sloped direction, and
said feed chute sequentially extends outwardly from said ammunition magazine box outlet opening, above said outer end portion of said support plank, and then downwardly to said inlet end of said angled housing.

7. The aircraft armament apparatus of claim 6 further comprising:
an inboard gun mount station disposed on said outer end portion of said support plank between said 40 mm machine gun and said slot,
a 7.62 mm mini machine gun secured to and depending from said inboard gun mount station,
a 7.62 mm ammunition magazine box secured to said longitudinally intermediate portion of said top side of said support plank inboard of said slot and having an outlet opening,
a second flexible feed chute having an inlet end connected to said outlet opening of said 7.62 mm ammunition magazine box and an outlet end operatively connected to said 7.62 mm mini machine gun, said second flexible feed chute extending downwardly through said slot, and
a 7.62 mm ammunition belt extending from the interior of said 7.62 mm ammunition magazine box to said 7.62 mm mini machine gun through the interior of said second flexible feed chute.

8. For use in conjunction with an aircraft having a cabin area, armament apparatus comprising:
an elongated support plank structure longitudinally extendable transversely through said cabin area, said elongated support plank structure having a longitudinally central portion anchored within the cabin area in a manner such that an outer end portion of said support plank structure extends outwardly beyond a side of the aircraft, said outer end portion having a tip section removably securable thereto for pivotable movement relative to said outer end portion about a horizontal hinge line transverse to the longitudinal direction of said support plank structure, said outer end portion of said support plank structure further having top and bottom sides, a slot extending therethrough between said top and bottom sides, and an inboard gun mount station disposed between said slot and said hinge line;
a 40 mm machine gun having a gun feeder mechanism with an inlet;
gun mount means for receiving and operatively supporting said 40 mm machine gun;
securing means for selectively and removably securing said gun mount means to (1) said inboard gun mount station, (2) said outer end portion of said support plank structure at said hinge line in place of said tip section, or (3) on said tip section when said tip section is installed on said outer end portion of said support plank structure;
a 40 mm ammunition magazine box having an outlet opening;
means for securing said 40 mm ammunition magazine box to the top side of said longitudinally central portion of said support plank structure;
a 40 mm ammunition belt disposed within said ammunition magazine box;
a flexible feed chute having an inlet end and an outlet end and being extendable through said slot;
a feed adapter interconnectable between said gun feeder mechanism inlet and said outlet end of said flexible feed chute, said feed adapter including:
angled housing means for interiorly receiving said ammunition belt and longitudinally supplying it to said gun feeder mechanism, said angled housing means having an outlet end, an inlet end, and a bent intermediate portion disposed between the angled housing means inlet and outlet ends, and
a roller member rotationally supported in said intermediate portion of said housing and positioned to rollingly support said ammunition belt as it passes inwardly through said housing into said gun feeder mechanism;
means for releasably connecting said inlet end of said feed chute to said outlet opening of said ammunition magazine box;
means for releasably connecting said outlet end of said feed chute to said inlet end of said housing; and
means for releasably connecting said outlet end of said housing to said gun feeder mechanism inlet.

9. The armament apparatus of claim 8 wherein:
said gun mount means include a deck plate having a spaced series of mounting holes formed therein and an underside, and a cradle structure depending from the underside of said deck plate and adapted to receive and support said 40 mm machine gun.

10. The armament apparatus of claim 9 wherein:
said tip section has a bomb rack structure secured to and depending therefrom, and
said securing means include means for securing said deck plate to said bomb rack structure.

11. The armament apparatus of claim 9 wherein:
said securing means include a hinge line adapter structure intersecurable between said deck plate and said outer end portion of said support plank structure, at said horizontal hinge line, when said tip section is removed therefrom.

12. The armament apparatus of claim 9 wherein:
said securing means include means for removable securing said deck plate to an underside portion of said inboard gun mount station.

13. The armament apparatus of claim 8 wherein:
said angled housing means have an included angle of approximately 90 degrees.

14. The armament apparatus of claim 8 wherein:
said angled housing means have an included angle of approximately 22.5 degrees.

15. The armament apparatus of claim 8 further comprising:
a 7.62 mm mini machine gun,
means for removably securing said 7.62 mm mini machine gun to said inboard gun mount station when said 40 mm machine gun is mounted on said outer end portion of Said support plank structure at said hinge line in place of said tip section, or on said tip section when said tip section is installed on said outer end portion of said support plank structure, a 7.62 mm ammunition magazine box having an outlet opening;

means for removably securing said 7.62 mm ammunition magazine box to the upper side of said longitudinally intermediate portion of said support plank structure, a second flexible feed chute extendable through said slot and having inlet and outlet ends, means for removably securing said inlet end of said second flexible feed chute to said outlet opening of said 7.62 mm ammunition magazine box, means for removably and operatively securing said outlet end of said second flexible feed chute to said 7.62 mm mini machine gun, and a 7.62 mm ammunition belt disposed within said 7.62 mm ammunition magazine box and extendable from said outlet opening thereof through the interior of said second flexible feed chute to said 7.62 mm mini machine gun.

* * * * *